US011236285B2

(12) United States Patent
Vennampalli et al.

(10) Patent No.: US 11,236,285 B2
(45) Date of Patent: Feb. 1, 2022

(54) HIGH TEMPERATURE ZINC COMPLEX GREASE

(71) Applicant: INDIAN OIL CORPORATION LIMITED, Maharashtra (IN)

(72) Inventors: Manohar Vennampalli, Faridabad (IN); Naveen Kumar Pokhriyal, Faridabad (IN); Virender Kumar, Faridabad (IN); Veena Rani Bansal, Faridabad (IN); Deepak Saxena, Faridabad (IN); Sankara Sri Venkata Ramakumar, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 0 days.

(21) Appl. No.: 17/140,891

(22) Filed: Jan. 4, 2021

(65) Prior Publication Data

US 2021/0207054 A1 Jul. 8, 2021

(30) Foreign Application Priority Data

Jan. 3, 2020 (IN) .............................. 202021000297

(51) Int. Cl.
| | |
|---|---|
| *C10M 169/06* | (2006.01) |
| *C07F 3/06* | (2006.01) |
| *C10M 101/02* | (2006.01) |
| *C10M 113/08* | (2006.01) |
| *C10M 129/34* | (2006.01) |
| *C10M 129/40* | (2006.01) |
| *C10M 141/02* | (2006.01) |
| *C10N 20/00* | (2006.01) |
| *C10N 30/00* | (2006.01) |
| *C10N 10/04* | (2006.01) |
| *C10N 30/06* | (2006.01) |

(52) U.S. Cl.
CPC ............ *C10M 169/06* (2013.01); *C07F 3/06* (2013.01); *C10M 101/025* (2013.01); *C10M 113/08* (2013.01); *C10M 129/34* (2013.01); *C10M 129/40* (2013.01); *C10M 141/02* (2013.01); *C10M 2201/0626* (2013.01); *C10M 2203/1006* (2013.01); *C10M 2207/123* (2013.01); *C10M 2207/126* (2013.01); *C10M 2207/40* (2013.01); *C10N 2010/04* (2013.01); *C10N 2020/01* (2020.05); *C10N 2030/00* (2013.01); *C10N 2030/06* (2013.01); *C10N 2030/26* (2020.05)

(58) Field of Classification Search
CPC .................. C10M 137/10; C10M 169/06; C10M 117/00; C10M 159/24; C10M 137/02; C10M 159/20; C10M 159/22; C10M 2207/122; C10M 2223/02; C10M 2207/1406; C10M 2207/121; C10M 2223/045; C10M 2223/049; C10M 2207/028; C10M 2207/141; C10M 2207/262; C10M 2207/26; C10M 2207/2613; C10M 2207/2626; C10M 2219/046; C10M 2223/10; C10M 2219/089; C10M 2207/22; C10M 2207/129; C10M 2207/1206; C10M 2207/125; C10M 2207/106; C10M 2207/123; C10N 2010/00; C10N 2010/12; C10N 2010/14; C10N 2010/02; C10N 2010/04

See application file for complete search history.

(56) References Cited

U.S. PATENT DOCUMENTS

| | | | |
|---|---|---|---|
| 1,767,076 A | 6/1930 | Nicholas | |
| 1,789,026 A | 1/1931 | Sullivan, Jr. | |
| 2,034,405 A | 3/1936 | MacLaren | |
| 2,356,313 A | 8/1944 | Gerlicher | |
| 2,362,233 A | 11/1944 | Bannon | |
| 2,445,936 A | 7/1948 | August | |
| 2,457,582 A * | 12/1948 | McCarthy | ............... C10M 5/00 508/134 |
| 2,514,296 A | 7/1950 | Small | |
| 2,846,392 A * | 8/1958 | Kolfenbach | ........... C10L 1/1881 508/522 |
| 2011/0168479 A1 | 7/2011 | Nakata | |

FOREIGN PATENT DOCUMENTS

| | | |
|---|---|---|
| CN | 104403737 | 3/2015 |
| CN | 105087169 A | 11/2015 |
| GB | 347574 | 4/1931 |
| GB | 1039753 | 8/1966 |
| RU | 2352620 | 4/2009 |

* cited by examiner

*Primary Examiner* — Vishal V Vasisth
(74) *Attorney, Agent, or Firm* — Maschoff Brennan

(57) ABSTRACT

Zinc complex greases with different complexing acids having dropping points comparable to lithium greases and tailor-made dropping points can be made by processing at low temperature in open as well as close kettle process. The present invention discloses a process of manufacturing Zinc complex greases—through reaction of fatty acid and complexing acid with zinc oxide in mineral oil to obtain zinc complex greases having high dropping points of 180 to 280° C.

11 Claims, No Drawings

HIGH TEMPERATURE ZINC COMPLEX GREASE

FIELD OF THE INVENTION

This invention deals zinc complex greases which has superior dropping points, high extreme pressure, and excellent water repellent characteristics. More specifically, zinc complex greases with different complexing acids having dropping points similar to lithium greases and tailor-made dropping points can be made in low temperature through open as well as close kettle process.

BACKGROUND OF THE INVENTION

In recent past multi fold rise of lithium hydroxide price regenerated interest in non-lithium greases. Processing of lithium-based greases require pressurized reactors and high temperature (>200° C.). Calcium greases have some limitations such as low dropping point. Calcium sulfonate complex and Polyurea greases have high dropping points and long life. But these greases are expensive and require special manufacturing techniques.

The exploration for new soap grease thickeners by different research groups and grease manufacturers resulted in several new soap-based thickeners such as Ni, Fe, Cd, Pb, Ti, Mg etc. However, these soap-based thickeners are mostly of academic interest and have limited or no suitability for commercial application or use. In our search for new thickener systems Zinc (Zn) soap thickened greases were found to have potential as a new thickener system. Many Zn based compounds are in use in lubricants. They are mostly used as additives and rarely as a grease thickener. Zn soap has low thickening power in mineral oil and thus needs to be used in high percentage to thicken oil for obtaining desired consistency of grease compared to lithium greases. As suggested by Lawrence et al. (A.S.C., J. Inst. Petroleum Technol., 1938, 24, 207-220) the failure to bodying oil is may be due to low gelling capacity of the Zn soap in oil.

The known Zn soap grease in literature is mostly based on "zinc stearate" ($ZnSt_2$), having lower dropping points around 110-130° C. As mentioned in U.S. Pat. No. 2,356,313, $ZnSt_2$ thickened greases having dropping point of 120° C. remain softer at very low temperatures −73 to −96° C. and were useful for low temperature applications only. The reported $ZnSt_2$ thickened grease contains 30-50 parts by weight of thickener.

Zinc soap grease process as per the composition mentioned in U.S. Pat. No. 2,356,313 is as follows: a stirred mass of fatty acid such as stearic acid in 40 parts by weight of paraffinic base oil (ISO VG 150) was heated to melt, then zinc oxide was added and heated to 110-120° C. The reaction mixture was maintained at the temperature while stirring for 2 hours and then remaining base oil slowly added. Cooled to below 90° C. and milled to get finished grease. As shown in Table 1, 40-50 parts by weight zinc stearate is required to form NLGI grade 2 grease which is known in literature. When used 12-hydroxystearic acid (12-HSA) in place of stearic acid with similar procedure did not form grease structure of NLGI 2 consistency even with 40-50 parts by weight of 12-HSA. The dropping point is low for these zinc stearate grease and zinc 12-hydroxy stearate thickened greases with low thickening ability.

TABLE 1

| Components | NLGI grade (ASTM D217) | Dropping Point (ASTM D566) |
|---|---|---|
| Preformed zinc stearate(40-50 parts by weight) | 2-3 | 115-120° C. |
| Zinc stearate (Stearic acid + Zinc Oxide) (40-50 parts by weight) | 2-3 | 115-120° C. |
| Zinc 12-hydroxystearate (12-hydroxystearic acid + Zinc Oxide) (40-50 parts by weight) | 1-2 | 130-150° C. |

Zinc base greases have water repellent characteristic, work as anti-galling agents and useful for lubrication of machines that operate in water such as plungers of hydraulic elevators, piston rods of water pumps, and as slushing compounds to protect the wire cables from rusting. (Lubrication and Lubricants, New York, McGraw-Hill Book, 1939, P-107)

As described in U.S. Pat. No. 2,362,233, Bannon used zinc stearate thickened lubricating grease for lubrication of rubber manufacturing parts at low temperature, where the claimed thickener is of 10-60 parts by weight. In U.S. Pat. No. 2,514,296, Small and Thomas suggested grease like lubricant resistant to hydrocarbon solvent and suitable to use −73° C., in which the zinc stearate is around 47 parts by weight.

As summarized by T. Polishuk in book "A Brief History of Lubricating Greases" Zinc soaps are used very rarely as thickeners to produce lubricating greases as they have very low ability to thicken oil. Their use is mainly in modifying properties such as soda soap to give smoother grease with improved properties (Ibid, P.680). Zinc stearate is mostly found in literature for use as co-thickener or mixed thickener with other thickener systems. These types of thickener systems mixed together or added one by one to achieve desired grease. In RU patent 2.352,620 lithium-zinc soap-based grease reported for corrosion prevention and sealing of gas leaks of stop valves sealing units. Nasui et al. described lubricating grease with zinc soap as thickener in RO92145 A2 1987-07-30. The grease used for lubrication of valves, faucets, and joints. The lubricating grease consists of 60-75 parts by weight base oil, 20 parts by weight zinc soap and 15-20 parts by weight graphite or asbestos.

US patent application US 2011/0168479 A1 described about diurea and zinc stearate mixed grease for application in speed reduction gear and electrical power steering apparatus for reducing the attacking property on resin. In this patent zinc stearate grease was prepared in poly alpha olefin (PAO) base oil with 40:60 ratio of zinc stearate:PAO and mixed in diurea grease.

Zinc stearate containing compounds or paste like materials are also known in literature which are useful for different applications. As described in Chinese patent 104403737 zinc stearate based capsule demoulding agent has been prepared in combination with silicone grease, paraffin wax, stearic acid, etc. As mentioned in U.S. Pat. No. 2,034,405 zinc stearate was used as stabilizing agent for castor oil.

Zinc stearate and zinc-based compounds have wide variety of applications in cosmetics, pharmaceuticals, paints, Bakelite, plastics, resin powders, rubber goods, putty and pesticides. In plastics and rubber industry zinc-based compounds are mainly used as releasing agents and lubricants. Various zinc-based compounds are used in lubricating greases as additives, structure modifiers and fillers. Among the additives zinc dialkyldithiophosphates (ZDDPs) are anti wear and extreme pressure additives present in most of the grease formulations. Zn napthanates is also used to thicken lubricating oils to result in semi fluid natured lubricants. Zinc dithiocarbamates (ZnDTC), zinc oxide, zinc borate, zinc sulfide, zinc nitride are other additives often used in lubricating grease formulations.

Metal 12-hydroxy stearates are most widely used thickeners in grease industry. Zinc 12-hydroxy stearate (Zn-12HSA) is known as co-thickener or anti galling and water repelling agent in some lubricating greases. As mentioned in U.S. Pat. No. 2,445,936 Zn-12HSA was used to improve water resistance of sodium and lithium greases. British patent 1.039,753 describes about a method of preparation of lubricating gel where zinc oxide fine particles having improved surface area coated with organic carboxylic acids resulted in improved grease with excellent water resistance and excellent stability at high temperatures. Zn-12HSA alone found to show very low thickening ability, even 60 parts by weight of Zn-12HSA shows very low thickening of base oil.

Simple soap results from the reaction of one fatty acid, such as 12-HSA, and a metallic hydroxide, such as lithium hydroxide. This produces a simple lithium soap which is the most common worldwide. The metallic hydroxide used defines the thickener type. If calcium hydroxide were used with a fatty acid, the grease would be called simple calcium soap. Grease thickener with more than one fatty acid, such as 12-HSA and complexing acid, such azelaic resulting product is called a complex soap grease. If lithium hydroxide were used, the result would be lithium complex grease and so on.

Chinese patent application 105087169A describes about synthesis of zinc stearate. Some other reports where zinc soap based lubricating greases are described—U.S. Pat. Nos. 1,767,076, 1,789,026, British patent 347,574.

So far reported zinc soap thickened greases have low dropping points (around 120° C.) and need high thickener content (about 50 parts by weight). Unlike conventional lithium, calcium, barium complex greases, zinc complex greases are not known or reported in the literature.

Objectives of the Present Invention

It is the primary objective of the present invention is to provide zinc complex greases having properties of higher dropping points, high extreme pressure, and excellent water repellent characteristics.

It is the further objective of the present invention is to provide zinc complex greases having tailor made dropping points can be made in open kettles using low temperature energy efficient processes.

It is the further objective of the present invention is to provide a process in which two stage addition of complexing agents and zinc oxides which leads to complex greases having dropping points between 200 to 280° C.

It is the further objective of the present invention is to provide zinc complex greases having tailor made dropping points can be made in close rector/kettles using single step low temperature energy efficient processes.

SUMMARY OF THE INVENTION

Accordingly, the present invention provides a zinc complex grease composition comprising of base oils, saponifiable materials, zinc oxide, alkali hydroxides and complexing agents.

In another feature of the present invention, zinc complex grease composition comprising of very low or no water.

In one feature, the present invention zinc complex grease having properties of higher dropping points, high extreme pressure and excellent water repellent characteristics.

In another feature of the present invention, the saponifiable material is selected from fatty acids, hydroxy-substituted fatty acids, esters, or mixtures thereof.

In another preferred feature of the present invention, saponifiable material is 12-hydroxystearic acid or stearic acid.

In another feature of the present invention, the amount of saponifiable material is in range of 10-30 parts by weight.

In another preferred feature of the present invention, saponifiable material is in range of 20-26 parts by weight.

In another feature of the present invention, saponifiable material is in range of 22-25 parts by weight.

In another feature of the present invention, base oil is in range of about 50 parts by weight to about 80 parts by weight of the composition.

In another feature of the present invention, zinc oxide is in range of about 3 parts by weight to about 6 parts by weight of the composition.

In another feature of the present invention, complexing acid is in range of about 1 parts by weight to about 6 parts by weight of the composition.

According to another embodiment of the present invention, a process for preparing zinc complex grease in open kettle comprising the steps of:
 a) adding saponifiable materials with suitable base oil and heating;
 b) adding zinc oxide to the mixture of step (a) and heating gradually to 100-110° C. while controlling frothing and stirring for one hour
 c) adding complexing acids and remaining amount of zinc oxide to mixture of step (b); raising temperature to 135-140° C. and maintaining at this temperature for one hour with continuous stirring
 d) heating to elevated temperatures of around 170-175° C. with continuous stirring;
 e) resultant mass dehydration with the help of vacuum,
 f) addition of remaining base oils as cut back
 g) cooling and homogenizing/milling to obtain final product, optionally water;

According to another embodiment of the present invention, a process for preparing zinc complex grease in closed kettle/pressurized reactor comprising the steps of:
 a) adding saponifiable materials, complexing acids and zinc oxide with suitable base oil in single step;
 b) closing the kettle/reactor securely;
 c) heating gradually to 110-115° C. and maintaining at this temperature for one hour under continuous stirring.
 d) further raising temperature to 170-175° C. in one hour period and maintaining this temperature under stirring for one hour.
 e) de-pressurizing with caution to avoid any soap leakage followed by dehydration of resultant mass under vacuum with continuous stirring for half an hour.
 f) addition of remaining base oils as cut back
 g) cooling and homogenizing/milling to obtain a smooth product. optionally water.

Various objects, features, aspects, and advantages of the present invention will become more apparent from the following detailed description of preferred embodiments of the invention.

DETAILED DESCRIPTION OF THE INVENTION

The invention relates to a zinc complex grease having properties such as combination of higher dropping points, extreme pressure and excellent water repellent characteristics without using additives. No prior art is available for zinc complex greases. Simple zinc greases prepared either using preformed zinc stearates or by in situ synthesis of zinc stearate soap by reaction of zinc oxide stearic acid are reported. The known prior arts for making in situ production of lithium complex greases need high temperature and high pressure for manufacturing and require addition of water to facilitate reaction. As per this invention, zinc complex greases having tailor made dropping points can be made in open as well as close kettle using low temperature energy efficient processes.

Present invention discloses open as well as close kettle/Pressurized reactor process in which addition of complexing agents and zinc oxide leads to complex greases formation having dropping points between 200 to 280° C.

According to a preferred feature of invention, zinc complex grease is obtained having following ingredients; 50 to 80 parts by weight base oils, 10 to 25 parts by weight saponifiable materials, 3 to 6 parts by weight zinc oxide and 1.0 to 6.0 parts by weight one or more complexing agents.

According to one embodiment of invention, zinc complex grease is produced by combining saponifiable materials in certain quantity of base oil and then reacting and heating to 100-110° C. with appropriate amount of zinc oxide in open kettle with continuous stirring till frothing subsided. When frothing subsided, remaining quantities of complexing acids were added, mixed and followed by addition of full quantity of zinc oxide and mass temperature was gradually raised to 130-140° C. maintained for one hour. Finally, mass temperature was raised to 170-175° C. The resultant mass was completely dehydrated under vacuum and remaining base oils were added as cut back. Mass was cooled and finally homogenized to get a smooth homogenous product.

According to one embodiment of invention, zinc complex grease is produced by combining saponifiable materials and complexing acids in certain quantity of base oil with appropriate amount of zinc oxide in single step addition in a closed reactor. The mass temperature raised to 110-115° C. and mass was maintained at this temperature for one hour under continuous stirring. Mass was further heated in two hours time to 170-175° C. Then, the reactor was de-pressurized with caution to avoid any soap leakage. The resultant mass was completely dehydrated under vacuum and remaining base oils were added as cut back. Mass was cooled and finally homogenized to get a smooth homogenous product.

According to this invention, at least one saponifiable material, one complexing acid and zinc oxide must be employed. Softer or harder grades of greases may be made by varying the thickener content. Tailor made dropping points can be achieved by varying complexing acids and their ratios. As per the invention, complexing acids not only boost the dropping point but also gives structure/bodying power to the simple zinc soap.

As per this invention, saponifiable material refers to fatty acids, hydroxy-substituted fatty acids and their esters and their mixtures. Among saponifiable materials 12-hydroxystearic acid and stearic acid were used and 12-hydroxystearic acid is most preferred. The amount of saponifiable material in embodiment of this invention can vary between 10 parts by weight and 30 parts by weight. Preferably, the amount of saponifiable material in NLGI grade 2 grease is between 20 to 26 parts by weight and most preferably between 22 to 25 parts by weight.

As per this invention, saponifiable material is reacted with 2 to 6 parts by weight zinc oxide to make greases. Zinc oxide used in embodiments of this invention is commercially available white fine powder having 99% purity. Zinc hydroxide and Zinc sulphide can also be used as Zinc oxide source.

According to the further embodiment of the current invention, zinc complex greases having dropping points similar to lithium greases are produced by incorporating one or more complexing agents and these are added either prior or along with addition of zinc oxide. The total amount of complexing acids is between 1.0 to 6.0 parts by weight, preferably 3.0 to 5.5 parts by weight and most preferably 4.0 to 5.0 parts by weight. Short chain monocarboxylic acids are acetic acid, propanoic acid, hydroxybenzoic acids or their mixtures. Some more suitable polycarboxylic complexing acids are adipic acid, sebacic acid, boric acid, phosphoric acids and their mixtures.

According to one of the embodiment of invention, little amount of water added during initial charging helped in initiation of the saponification process. The amount of water used is 0.2 to 1.0 parts by weight, preferably 0.3 to 0.8 parts by weight and most preferably 0.4 to 0.6 parts by weight. However, use of water more than 1.5 parts by weight produced excessive frothing.

Zinc complex grease was prepared in this invention as follows: 45 parts by weight of Group I paraffinic base oil (95 cSt at 40° C.) was charged to mixing vessel followed by monobasic fatty acid (stearic acid/12-hydroxy stearic acid) heated to 75° C. with continuous stirring. Zinc oxide corresponding to monobasic fatty acid was added slowly to above mixture and the mixture was gradually heated to 100-110° C. and mass was maintained at this temperature with continuous stirring till frothing subsided. When frothing subsided, dibasic acid/complexing acid and zinc oxide corresponding to dibasic acid/complexing acid was added. Mass temperature was raised to 135-140° C. and maintained at this temperature for one hour with continuous stirring, further heating to 170-175° C. The reaction mixture was maintained at 170-175° C. with continuous stirring for half an hour for dehydration under assistance of vacuum suction, followed by cut back of the mass with remaining base oil. The heating was stopped, and cold oil was circulated to speed up cooling. When cooled to 90-95° C., grease was milled through colloidal mill/homogenizer to get a smooth homogenous product.

As shown in Table 2, Example-1 fluid mass formed when 15 parts by weight of stearic acid was used along with 3 parts by weight of dibasic acid (1,10-decanedioic acid). With increasing stearic acid content, greases as shown in Examples 2 & 3 having consistency between NLGI grade 2-3 were formed with increased dropping point from 170-190° C. indicating complexation. When stearic acid was used in 30 or more parts by weight, very hard mass formed which is hard to work upon. As shown in Example 5, NLGI grade 3 grease was formed with dropping point above 260° C. but the shear stability of all these greases was found to be poor. Complexation of zinc stearate with dicarboxylic acid leads to higher dropping points as shown in Table 2.

TABLE 2

| Components | Example-1 | Example-2 | Example-3 | Example-4 | Example-5 |
|---|---|---|---|---|---|
| Stearic acid, parts by weight | 15.00 | 20.00 | 25.00 | 30.00 | 25.00 |
| Sebacic acid, parts by weight | 3.00 | 3.00 | 3.00 | 3.00 | 4.00 |
| Zinc oxide, parts by weight | 3.36 | 4.07 | 4.79 | 5.50 | 5.00 |
| Group I paraffinic base oil (95 cSt at 40° C.), parts by weight | 47.00 | 44.00 | 40.00 | 37.00 | 39.00 |
| Group I paraffinic base oil (430 cSt at 40° C.), parts by weight | 31.64 | 28.93 | 27.21 | 24.50 | 27.00 |
| Total | 100.00 | 100.00 | 100.00 | 100.00 | 100.00 |

| Test | Test Method | Units | Results | | | | |
|---|---|---|---|---|---|---|---|
| Dropping Point | ASTM D2265 | ° C. | Fluid mass | 175 | 186 | — | 232 |
| Penetration worked | ASTM D217 | mm/10 | 420 | 293 | 254 | Not workable | 242 |
| Change in penetration after $10^5$X double strokes | ASTM D217 | mm/10 | >100 | >100 | >100 | | >100 |

As shown in Table-1, reaction of 12-hydroxysteric acid (12-HSA) with zinc oxide up to 50 parts by weight has shown poor thickening ability in paraffinic base oil. Examples 6 to 9 were made using process similar to example-1 grease except that different amounts of 12-HSA were used while keeping complexing acid constant. Results indicate that grease made with 10 and 15 parts by weight of 12-HSA are fluid in nature as shown in Table-3. With 20 parts by weight of 12-HSA and 4 parts by weight of complexing acid, greases having dropping point of more than 260° C. and NLGI grade 1 to 1.5 consistencies were obtained.

TABLE 3

| Components | Example-6 | Example-7 | Example-8 | Example-9 |
|---|---|---|---|---|
| 12-Hydroxystearic acid, parts by weight | 10.0 | 15.0 | 20.0 | 30.0 |
| Sebacic acid, parts by weight | 4.0 | 4.0 | 4.0 | 4.0 |
| Zinc oxide, parts by weight | 2.96 | 3.64 | 4.32 | 5.67 |
| Group I paraffinic base oil (95 cSt at 40° C.), parts by weight | 49.8 | 46.40 | 43.00 | 36.00 |
| Group I paraffinic base oil (430 cSt at 40° C.), parts by weight | 33.24 | 30.96 | 28.68 | 24.33 |
| Total | 100.00 | 100.00 | 100.00 | 100.00 |

| Test | Test Method | Units | Results | | | |
|---|---|---|---|---|---|---|
| Penetration worked | ASTM D217 | mm/10 | Fluid mass | Fluid mass | 309 | 245 |
| Dropping Point | ASTM D2265 | ° C. | | | 272 | 232 |

To evaluate the role of complexing agents, Examples-10, 11, 12, 13 & 14, grease batches were made using same equipments, raw materials, amounts and manufacturing process as the Example-1, except using different quantities of sebacic acid and corresponding quantity of zinc oxide. Fluid mass was obtained when 0.0 and 1.0 parts by weight of complexing acid were used as shown in Table-4. This indicates that complexing acid not only increases dropping point but is also necessary to obtain grease consistency.

When 2 and 3 parts by weight of complexing acid was used, NLGI grade 0 and grade 1 consistency greases having dropping point of 154° C. and 194° C. were obtained respectively. Use of 4 and 5 parts by weight of complexing acid resulted NLGI grade 2 and 3 greases respectively having dropping point of 262° C. and 279° C. as shown in Table-4. With 6 parts weight of complexing acid used, very hard having dropping point more than 300° C. was obtained. Example-16 grease became hard during saponification process and required addition of oil for stirring. Test results indicate that 4 to 5 parts by weight of sebacic acid is sufficient to obtain dropping points more than 260° C.

TABLE 4

| Components | Example-10 | Example-11 | Example-12 | Example-13 | Example-14 | Example-15 | Example-16 |
|---|---|---|---|---|---|---|---|
| 12-Hydroxystearic acid, parts by weight | 25.00 | 25.00 | 25.00 | 25.00 | 25.00 | 25.00 | 25.00 |
| Sebacic acid, parts by weight | 0.00 | 1.00 | 2.00 | 3.00 | 4.00 | 5.00 | 6.00 |
| Zinc oxide, parts by weight | 3.39 | 3.79 | 4.19 | 4.59 | 5.00 | 5.50 | 5.80 |
| Group I paraffinic base oil (95 cSt at 40° C.), parts by weight | 43.00 | 42.00 | 41.00 | 40.00 | 40.00 | 39.50 | 38.00 |
| Group I paraffinic base oil (430 cSt at 40° C.), parts by weight | 28.61 | 28.21 | 27.81 | 27.41 | 26.00 | 25.00 | 25.20 |
| Total | 100.00 | 100.00 | 100.00 | 100.00 | 100.00 | 100.00 | 100.00 |

| Test | Test Method | Units | Results | | | | | | |
|---|---|---|---|---|---|---|---|---|---|
| Penetration worked | ASTM D217 | mm/10 | Fluid mass | Fluid mass | 376 | 335 | 278 | 250 | 210 |
| Dropping Point | ASTM D2265 | ° C. | — | — | 154 | 194 | 262 | 279 | 301 |

To explore/demonstrate effect of different complexing dicarboxylic acids other than sebacic acid, five grease batches of grease (Example-17 to 21) were made using 4 parts by weight of different dicarboxylic acids such as azelaic, suberic, pimillic, adipic and glutaric acids respectively. As shown in Table-5, results indicate that all the dicarboxylic acids resulted in formation of zinc complex greases and greases made with sebacic acid and subaric have dropping point of more than 260° C.

TABLE 5

| | Example-17 | Example-18 | Example-19 | Example-20 | Example-21 |
|---|---|---|---|---|---|
| Zinc oxide, parts by weight | 5.12 | 5.26 | 5.42 | 5.61 | 5.85 |
| 12-Hydroxystearic acid, parts by weight | 25.00 | 25.00 | 25.00 | 25.00 | 25.00 |
| Dicarboxylic acid (4.00 parts by weight) | Azelaic acid | Suberic acid | Pimellic acid | Adipic acid | Glutaric acid |
| Group I paraffinic base oil (95 cSt at 40° C.), parts by weight | 39.5 | 39.4 | 39 | 39 | 39 |
| Group I paraffinic base oil (430 cSt at 40° C.), parts by weight | 26.8 | 26.34 | 26.58 | 26.39 | 26.15 |
| Total | 100.00 | 100.00 | 100.00 | 100.00 | 100.00 |

| Properties | Test Method | Units | | | | | |
|---|---|---|---|---|---|---|---|
| Drop Point | ASTM D2265 | ° C. | 265 | 270 | 238 | 238 | 198 |
| Penetration worked | ASTM D217 | Mm/10 | 295 | 282 | 279 | 281 | 294 |

TABLE 5-continued

| | | | | | | | |
|---|---|---|---|---|---|---|---|
| Change in penetration after 10⁵X double strokes | ASTM D217 | | +43 | +43 | +59 | +55 | +59 |
| Roll Stability, 16 h, rt | ASTM D1831 modified | | +51 | +49 | +69 | +69 | +61 |
| Copper corrosion, 100° C., 24 hr | ASTM D4048 | Rating | 1a | 1a | 1a | 1a | 1a |
| Water Wash Out, 80° C., 1 hr, loss | ASTM D1264 | Wt % Off loss | 2.41 | 1.18 | 3.50 | 3.92 | 2.10 |
| Water spray Off | ASTM D4049 | Wt % Off loss | 32.6 | 21.9 | 44.2 | 43.8 | 39.2 |

To demonstrate the role of water, grease batches (Example-22 to 26) were made similar to Example-14 grease, except using water in different dosages. In example 22 grease when no water is used, saponification starts after stirring the mass at 100° C. for about 30 minutes. This indicates that water was not essential for saponification. However addition of water initiates the reaction between acids and zinc oxide as shown in Table-6. In examples 23 and 24 greases, saponification with controlled frothing was observed when 0.1 and 0.5 parts by weight of water used. Excessive frothing was observed with 1.5 and 3.0 parts by weight of water.

TABLE 6

| | Example no. | | | | |
|---|---|---|---|---|---|
| Components/ Character | Example-22 | Example-23 | Example-24 | Example-25 | Example-26 |
| Water, parts by weight | 0.0 | 0.1 | 0.5 | 1.5 | 3.0 |
| Reaction initiation when mass stirred at 90-100° C. | After 30 minutes | After addition of water | After addition of water | Excessive frothing | Excessive frothing |

To demonstrate the role of process temperature and time, seven grease batches (Table-7, Example-27 to 33) were made using raw materials and amount similar to Example-14. Form data of these batches in Table-7 and their comparison with Example-14 grease it is evident that the best combination of thickener yield and dropping point is obtained by keeping the maximum process between 170-175° C. for 60 minutes.

TABLE 7

| | Example no. | | | | | | |
|---|---|---|---|---|---|---|---|
| Components/ Character | Example-27 | Example-28 | Example-29 | Example-30 | Example-31 | Example-32 | Example-33 |
| Maximum process temperature (° C.) | 135 | 155 | 175 | 195 | 215 | 175 | 175 |
| Time Grease maintained at maximum process temperature (minutes) | 60 | 60 | 60 | 60 | 60 | 10 | 30 |

TABLE 7-continued

| Components/ Character | Example-27 | Example-28 | Example-29 | Example-30 | Example-31 | Example-32 | Example-33 |
|---|---|---|---|---|---|---|---|
| Appearance, Visual | Creamy brown, smooth homogeneous | Light brown, smooth homogeneous | Light brown, smooth homogeneous | Brown, smooth homogeneous | Dark brown, smooth homogeneous | Light brown, smooth homogeneous | Light brown, smooth homogeneous |
| Worked Penetration, mm/10, ASTM -217 | 248 | 289 | 272 | 279 | 300 | 275 | 278 |
| Dropping Point, ° C., ASTM D2265 | 238 | 245 | 262 | 262 | 260 | 261 | 263 |
| Water content, wt %, ASTM D95 | 0.9 | 0.3 | 0.0 | 0.0 | 0.0 | 0.2 | trace |

To demonstrate the closed reactor process, a grease batch (Example-34) was made using raw materials and amount similar to Example-14: In a closed reactor, 45 parts by weight of Group I paraffinic base oil (95 cSt at 40° C.) was charged to reactor followed by 12-HSA, dicarboxylic acid and 0.1 parts by weight of water and then zinc oxide were added. Reactor was sealed and mass temperature was gradually raised to 110-115° C. and mass was maintained at this temperature for one hour under continuous stirring. Mass was further heated in two hours time to 170-175° C. Then, the reactor was de-pressurized with caution to avoid any soap leakage. After this, mixture was maintained at 170-175° C. with continuous stirring for half an hour for complete dehydration under vacuum suction. Cut back was done with remaining base oil. Heating was stopped and cold oil was circulating to speed up cooling. When mass was cooled to 90-95° C., grease was milled through homogenizer to get a smooth homogenous product. All test data of Example-34 grease was found similar to open kettle grease batch (Example-14) indicating that developed composition can be made though both open kettle as well as closed reactor processes as shown in Table-8. Since the open kettle process is simple and need less technology, we preferred the open kettle process in the examples of the current invention.

TABLE 8

| Components | Example-34 |
|---|---|
| 12-Hydroxystearic acid, parts by weight | 25.0 |
| Sebacic acid, parts by weight | 4.00 |
| Zinc oxide, parts by weight | 5.00 |
| Group I paraffinic base oil (95 cSt at 40° C.), parts by weight | 40.00 |
| Group I paraffinic base oil (425 cSt at 40° C.), parts by weight | 26.00 |
| Total | 100.00 |

| Test | Method | Units | |
|---|---|---|---|
| Penetration worked, | ASTM D217 | mm/10 | 272 |
| Change in penetration after 10⁵X double strokes | ASTM D217 | | +40 |
| Dropping Point | ASTM D2265 | ° C. | 262 |
| Heat Stability at 100° C. for 30 hrs, Oil Separation | ASTM D6184 | % wt. | 2.6 |
| Roll stability, 16 hrs, 25° C., Change in penetration | ASTM D1831 (modified) | % | 13.6 |
| Cu Corrosion at 100° C., 24 hrs | IP 112 | Rating | 1a |
| Water washout at 80° C., percent loss by mass | ASTM DI264 | Rating | 0.9 |
| Water Spray off, | ASTM D4049 | loss in % Wt | 30 |
| Low temperature torque at −20° C. | IP 186 | | |
| a) Starting torque | | gm/cm | 1875 |
| b) Running torque | | gm/cm | 1250 |
| Weld Load | IP 239 | Kg | 200 |
| Wear Scar Diameter | ASTM D2266 | mm | 0.65 |
| Shelf Life | | | 3 years |

Any commonly used oil, such as petroleum based naphthenic and paraffinic are well known in prior arts and can be used according to present invention. Synthetic base oils such as polyalphaolefins (PAO), polyalkyl gycol (PAG), alkylated aromatics may also be used for making greases. In some cases, base oils having higher solvency such as naphthenic base oil need lesser thickener to result NLGI grade 2 product while use of less solvency base oil can adversely affect the thickening efficiency of soap resulting into softer greases and this is easily understood by those having ordinary skill of grease making. Keeping in view of end application or for matching viscometrics, some oils such diesters and polyol esters should be added after saponiofication to avoid interaction with zinc oxide. Total amount of base oil/s added will be typically between 60% to 85% and most probably 65% to 75% for NLGI grade 2 grease.

Other performance additives described in prior arts may also be added to grease embodiments described in the invention. Such additives can include rust and corrosion inhibitors, metal deactivators, metal passivators, antioxidants, extreme pressure additives, friction modifiers, anti-wear additives, polymers, tackifiers, dyes, chemicals markers and fragrance imparters.

The compositions according to invention are preferably made according open batch process described herein. This process comprises the following steps: (1) adding and mixing in suitable grease making kettle an appropriate amount of base oil, saponifiable material, water and slowly heating to 75° C.; (2) slow addition of appropriate amount of zinc oxide as oil slurry under continuous agitation; (3) continue mixing while slowly heating the mass to 100-110° C. and maintain at this temperature under continuous stirring till frothing subsides; (4) mixing and heating the mass to 110-120° C. and maintain at this temperature for one hour and add complexing agents and corresponding amount of zinc oxide; (5) mixing and heating the mass to 135-140° C. and maintain at this temperature for one hour; (6) mixing and heating the mass to 165-170° C. and maintain for 1 hour (8) cut back with required/remaining quantity of base oil and cooling of the mass; (9) adding the performance additives below 90° C. if desired (10) milling/homogenizing o the mass to obtain final grease.

Certain steps of the process are not critical for obtaining preferred grease composition. The temperature at which saponifiable material and water were added is not critical, but preferred that they may be added below 90° C. Addition of complexing acid preferred at second stage to control frothing. One step addition of complexing acids along with saponifiable material also result in grease but requires extra caution to control frothing if complexing acid is added at the beginning. Addition sequence of saponifiable material, complexing agents and water is also not critical with respect to each other. Dehydration can be done with or without the help of vacuum.

Although the examples provided herein fall in NLGI grade 2, it should be further understood that the scope of this present invention includes all the NLGI consistency grades be harder or softer than NLGI 2. As used herein, quantities of ingredients are either by parts or by weight during manufacturing process, even though some ingredient such as water may not be present in final grease. Those having even ordinary skill of the art will appreciate upon reading this specification, including examples contained herein, that modifications and alterations to composition and methodology for making composition may be within.

Detailed description of the invention and claims were shown in Table 8, Example-34. As per the invention NLGI grade 2-3 zinc complex grease can be formed with combination of 12-hydroxy stearic acid (25.0 parts by weight), sebacic acid (4.0 parts by weight) and zinc oxide (5.0 wt %). The resultant grease was found to have dropping point above 260° C. which is in the range of other soap complex greases. Mechanical stability was also found to be good +40 units after $10^5$ double strokes.

Advantages of the Present Invention

1. A simple time and energy saving & energy efficient open as well as closed reactor process for manufacturing zinc complex grease where there is no prior art on zinc complex greases.
2. Zinc complex grease compositions and their manufacturing in which the mass ratio of carboxylic acid and complexing acid can be varied, to achieve different NLGI grades greases with varied dropping points.
3. The greases have combination of higher dropping points and good low temperature properties.
4. Inherent extreme pressure and anti-wear properties.
5. Inherent water repellent and water resistance properties

The invention claimed is:
1. A lubricating zinc complex grease composition consisting of:
   a) base oils;
   b) saponifiable materials;
   c) zinc oxide;
   d) complexing agents; and
   e) water;
   wherein the complexing agent is selected from dicarboxylic acid, polycarboxylic acid, mono carboxylic acids, boric acid, phthalic acid, and acetic acid and wherein the lubricating zinc complex grease composition has a dropping point in a range of 200 to 280° C.

2. The zinc complex grease composition according to claim 1, wherein the saponifiable material is selected from fatty acids, hydroxy-substituted fatty acids, esters, or mixtures thereof.

3. The zinc complex grease composition according to claim 1, wherein the saponifiable material is 12-hydroxystearic acid, stearic acid, or mixtures thereof.

4. The zinc complex grease composition according to claim 1, wherein the base oil is selected from API group I-III mineral base oils, synthetic base oils of API group IV, preferably paraffinic base oil, naphthenic base oil.

5. The zinc complex grease composition as claimed in claim 1, wherein the base oil is present in an amount of about 50 parts by weight to about 80 parts by weight of the composition.

6. The zinc complex grease composition as claimed in claim 1, wherein the saponifiable material is present in an amount of about 10 parts by weight to about 30 parts by weight of the composition.

7. The zinc complex grease composition as claimed in claim 1, wherein the zinc oxide is present in an amount of about 3 parts by weight to about 6 parts by weight of the composition.

8. The zinc complex grease composition as claimed in claim 1, wherein the complexing acid is present in an amount of about 1 part by weight to about 6 parts by weight of the composition.

9. An open kettle process for preparing a zinc complex composition, the process consisting of the steps of:
   a) adding saponifiable materials with a suitable base oil and heating to form a mixture;
   b) adding zinc oxide to the mixture of step (a) and heating gradually to 100-110° C. while controlling frothing and stirring for one hour;
   c) adding complexing acids and remaining amount of zinc oxide to the mixture of step (b); raising temperature to 135-140° C. and maintaining at this temperature for one hour with continuous stirring;
   d) heating to elevated temperatures of around 170-175° C. with continuous stirring;
   e) dehydrating a resultant mass of step (d) with the help of vacuum;
   f) addition of remaining base oils as cut back;
   g) cooling and homogenizing/milling to obtain final product: and
   h) adding water; and
   wherein the complexing agent is selected from dicarboxylic acid, polycarboxylic acid, mono carboxylic acids, boric acid, phthalic acid, and acetic acid.

10. A closed kettle process for preparing a zinc complex composition, the process consisting the steps of:
   a. adding saponifiable materials, complexing acids and zinc oxide with a suitable base oil to a kettle/reactor in a single step;
   b. closing the kettle/reactor securely;
   c. heating gradually to 110-115° C. and maintaining at this temperature for one hour under continuous stirring;
   d. further raising temperature to 170-175° C. in one hour period and maintaining this temperature under stirring for one hour;
   e. de-pressurizing with caution to avoid any soap leakage followed by dehydrating a resultant mass from step (d) under vacuum with continuous stirring for half an hour;
   f. adding remaining base oils as cut back g. cooling and homogenizing/milling to obtain a smooth product; and h. adding water; wherein the complexing agent is selected from dicarboxylic acid, polycarboxylic acid, mono carboxylic acids, boric acid, phthalic acid, and acetic acid.

11. The zinc complex grease composition as claimed in claim 1, having higher dropping points, good low temperature, inherent extreme pressure, anti-wear, water repellent and water resistance properties.

* * * * *